(12) United States Patent
Seo et al.

(10) Patent No.: US 7,889,603 B2
(45) Date of Patent: Feb. 15, 2011

(54) RECORDING MEDIUM, METHOD OF CREATING FILE OF THE RECORDING MEDIUM, AND METHOD AND APPARATUS FOR REPRODUCING THE SAME

(75) Inventors: Kang Soo Seo, Anyang-si (KR); Byung Jin Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1416 days.

(21) Appl. No.: 11/006,744

(22) Filed: Dec. 8, 2004

(65) Prior Publication Data

US 2005/0122853 A1  Jun. 9, 2005

(30) Foreign Application Priority Data

Dec. 9, 2003  (KR) .................. 10-2003-0088977

(51) Int. Cl.
*G11B 21/08* (2006.01)
(52) U.S. Cl. .................................. 369/30.03
(58) Field of Classification Search ................ None
See application file for complete search history.

(56) References Cited

U.S. PATENT DOCUMENTS

| | | | | |
|---|---|---|---|---|
| 5,995,457 | A * | 11/1999 | Jamail ..................... | 369/30.04 |
| 6,181,872 | B1 * | 1/2001 | Yamane et al. .............. | 386/112 |
| 2002/0135608 | A1 | 9/2002 | Hamada et al. | |
| 2003/0108164 | A1 * | 6/2003 | Laurin et al. ............. | 379/88.01 |
| 2003/0235402 | A1 * | 12/2003 | Seo et al. ...................... | 386/95 |
| 2004/0137188 | A1 * | 7/2004 | Lindholm et al. .......... | 428/64.1 |
| 2005/0019007 | A1 * | 1/2005 | Kato et al. .................... | 386/69 |
| 2005/0025461 | A1 * | 2/2005 | Kato et al. .................... | 386/95 |
| 2005/0105888 | A1 * | 5/2005 | Hamada et al. ............... | 386/95 |
| 2006/0062295 | A1 * | 3/2006 | Lin et al. ............... | 375/240.08 |
| 2006/0143666 | A1 * | 6/2006 | Okada et al. .................. | 725/89 |
| 2006/0146660 | A1 * | 7/2006 | Ikeda et al. .............. | 369/30.13 |
| 2006/0222332 | A1 * | 10/2006 | Van Gestel et al. ............ | 386/95 |

OTHER PUBLICATIONS

Korean Office Action for corresponding Application No. 10-2003-0088977 dated Jun. 28, 2010. (without English language translation).

* cited by examiner

*Primary Examiner*—Joseph H Feild
*Assistant Examiner*—Henok Heyi
(74) *Attorney, Agent, or Firm*—Harness, Dickey & Pierce, P.L.C.

(57) ABSTRACT

A recording medium, a method of creating a file of the recording medium, and a method and apparatus for reproducing the same are disclosed. In the recording medium including a plurality of recording layers, the method of creating a file of the recording medium includes continuously recording a stream data file within a first recording layer and a second recording layer among the plurality of recording layers, which are adjacent to one another, and forming a PlayList file so as to enable seamless playback of the recorded stream data file, wherein the PlayList file includes a presentation start time (IN-Time), at which playback begins, positioned in the first recording layer, and a presentation end time (OUT-Time), at which playback is ended, positioned in the second recording layer.

12 Claims, 9 Drawing Sheets

RECORDING MEDIUM, METHOD OF CREATING FILE OF THE RECORDING MEDIUM, AND METHOD AND APPARATUS FOR REPRODUCING THE SAME

This application claims the benefit of the Korean Patent Application No. 10-2003-0088977, filed on Dec. 9, 2003, which is hereby incorporated by reference as if fully set forth herein.

BACKGROUND OF THE INVENTION

1. Field of the Invention

The present invention relates to a recording medium, and more particularly, to a recording medium, a method of creating a file of the recording medium, and a method and apparatus for reproducing the same. Although the present invention is suitable for a wide scope of applications, it is particularly suitable for using a recording medium such as a blu-ray disc, which enables seamless playback between a plurality of recording layers.

2. Discussion of the Related Art

Optical discs are widely used as a recording medium for recording mass data. Presently, among a wide range of optical discs, a new high density optical recording medium, such as a blu-ray disc (hereinafter referred to as "BD"), is under development for recording (or writing) and storing high definition video and audio data for a long period of time. Currently, an optical recording and/or reproducing apparatus for recording and/or reproducing the blu-ray disc (BD), which is known to be the next generation recording medium technology, is under development as a next generation optical recording solution that is capable of having data significantly surpassing the conventional DVD, along with many other digital apparatuses.

More specifically, the blu-ray disc (BD) may be formed of a plurality of recording layers, and, in this case, the total recording capacity of the blu-ray disc (BD) is expanded by n number of times depending upon the number of recording layers, thereby allowing usage of the blu-ray disc (BD) as a high capacity recording medium. Accordingly, a disc having only one recording layer is called a single-layer disc, a disc having two recording layers is called a dual-layer disc, and a disc having a plurality of recording layers is called a multi-layer disc. Herein, the dual-layer disc may also be referred to as a multi-layer disc.

Although the development of a blu-ray disc (BD)-based optical recording and/or reproducing apparatus is in process, since the blu-ray disc (BD) standard is not completely provided, problems still remain in developing a complete optical recording and/or reproducing apparatus. More specifically, in fabricating the above-described multi-layer blu-ray disc (BD) or recording and/or reproducing the multi-layer blu-ray disc (BD), preferable reproducing methods for seamless playback between adjacent recording layers have not yet been disclosed. And, therefore, there lies many limitations in developing the blu-ray disc (BD)-based optical recording and/or reproducing apparatus.

SUMMARY OF THE INVENTION

Accordingly, the present invention is directed to a recording medium, a method of creating a file of the recording medium, and a method and apparatus for reproducing the same that substantially obviates one or more problems due to limitations and disadvantages of the related art.

An object of the present invention is to provide a recording medium, a method of creating a file of the recording medium, and a method and apparatus for reproducing the same recording data so as to enable seamless playback between adjacent layers and to provide file information controlling such data, thereby providing practical usage of a multi-layer disc, which includes a plurality of recording layers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a recording medium including a plurality of recording layers, a method of creating a file of the recording medium includes continuously recording a stream data file within a first recording layer and a second recording layer among the plurality of recording layers, which are adjacent to one another, and forming a PlayList file so as to enable seamless playback of the recorded stream data file, wherein the PlayList file includes a presentation start time (IN-Time), at which playback begins, positioned in the first recording layer, and a presentation end time (OUT-Time), at which playback is ended, positioned in the second recording layer.

In another aspect of the present invention, in a recording medium including a plurality of recording layers, a method of creating a file of the recording medium includes forming at least one title within the recording medium, wherein the at least one title is continuously formed within a first recording layer and a second recording layer among the plurality of recording layers, which are adjacent to one another, and forming at least one PlayList file for playing-back and controlling the at least one title, which is continuously formed within the two adjacent recording layers, wherein the at least one PlayList file includes a presentation start time (IN-Time), at which playback begins, positioned in the first recording layer, and a presentation end time (OUT-Time), at which playback is ended, positioned in the second recording layer.

In another aspect of the present invention, a recording medium includes a plurality of recording layers including at least a first recording layer and a second recording layer, and a file information area recording a PlayList file including at least one PlayItem, in order to playback and control a stream data file, which is continuously recorded within the first recording layer and the second recording layer among the plurality of recording layers, which are adjacent to one another, wherein the at least one PlayItem includes a presentation start time (IN-Time), at which playback begins, positioned in the first recording layer, and a presentation end time (OUT-Time), at which playback is ended, positioned in the second recording layer.

In another aspect of the present invention, a method of reproducing a recording medium includes reading a PlayList file from the recording medium including a plurality of recording layers, wherein the PlayList file includes at least one PlayItem, in order to playback and control a stream data file, which is continuously recorded within the first recording layer and the second recording layer among the plurality of recording layers, which are adjacent to one another, wherein the at least one PlayItem includes a presentation start time (IN-Time), at which playback begins, positioned in a first recording layer, and a presentation end time (OUT-Time), at which playback is ended, positioned in a second recording layer, and performing seamless playback between the first recording layer and the second recording layer, based upon the read PlayList file.

In a further aspect of the present invention, an apparatus for reproducing a recording medium includes a reading unit reading a PlayList file from the recording medium including a plurality of recording layers, wherein the PlayList file includes at least one PlayItem, in order to playback and control a stream data file, which is continuously recorded within the first recording layer and the second recording layer among the plurality of recording layers, which are adjacent to one another, wherein the at least one PlayItem includes a presentation start time (IN-Time), at which playback begins, positioned in a first recording layer, and a presentation end time (OUT-Time), at which playback is ended, positioned in a second recording layer, and a playback means performing seamless playback between the first recording layer and the second recording layer, based upon the read PlayList file.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "blu-ray disc (BD)" will be given as an example of the recording medium proposed herein. However, it will be apparent that the spirit or scope of the present invention may be equally applied to other types of recording medium.

Figure 1A:
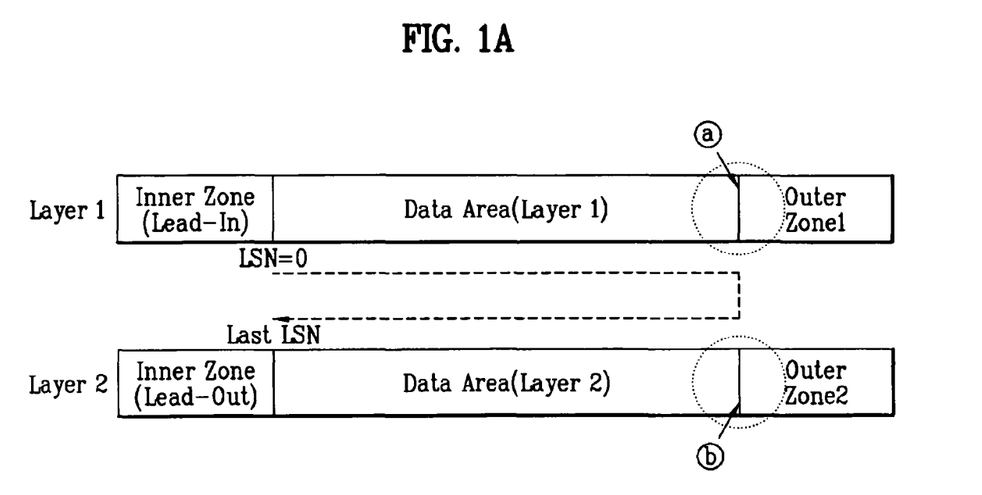
FIGS. 1A and 1B illustrate a structure of an optical disc having a plurality of recording layers and a structure for showing seamless playback between adjacent recording layers.
Figure 1B:
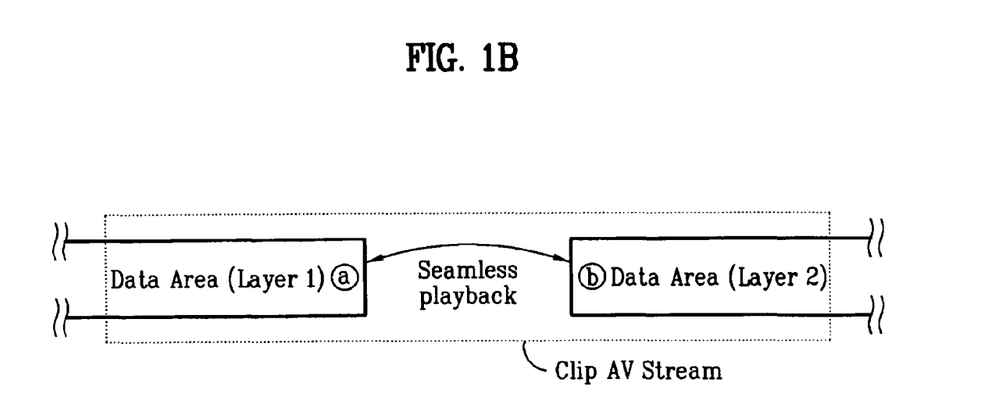

The present invention relates to a multi-layer disc having a plurality of recording layers. However, in the description of the present invention, a dual-layer disc that is formed of two recording layers will be given as an example for simplicity of the description. FIGS. 1A and 1B illustrate a structure of an optical disc (e.g., a dual-layer disc) having a plurality of recording layers and a structure for showing seamless playback between adjacent recording layers.

Referring to FIG. 1A, a first layer and a second layer adjacent to one another are formed in an optical disc. Each of the first layer and the second layer has control areas (i.e., inner zone and outer zone), and a data area is provided between the control areas of each layer, respectively. The data area is used for recording actual user data, wherein a logical sector number (LSN) is assigned to each recording unit in order to control a corresponding area. For example, in FIG. 1A, "LSN=0" is assigned to a front portion of the data area in the first layer, and "Last LSN" is assigned to a portion before the inner zone of the second layer. Therefore, in this case, the data will be recorded is a direction starting from "LSN=0" to "Last LSN" (shown as dotted arrow in FIG. 1A). Furthermore, although a last "LSN(ⓐ)" of the first layer and a beginning (or first) "LSN(ⓑ)" of the second layer are provided in different areas that are physically separated from one another, consecutive LSN values are assigned to the last "LSN(ⓐ)" of the first layer and the beginning (or first) "LSN(ⓑ)" of the second layer, respectively. FIG. 1B illustrates an expanded view of the last "LSN(ⓐ)" of the first layer and the beginning (or first) "LSN(ⓑ)" of the second layer. In the present invention, the seamless playback can be performed at a connection point between ⓐ and ⓑ.

Accordingly, in the detailed description of the present invention, in reproducing data recorded within an optical recording and/or reproducing apparatus (shown in FIG. 6) and providing the reproduced data to a user, "seamless playback" refers to reproducing data so that the user does not recognize the displayed image as a set of discontinuous images. More specifically, in order to enable the seamless playback to be carried out, the optical recording and/or reproducing apparatus (shown in FIG. 6) should perform a continuous reproduction of the data. And, furthermore, seamless playback is also required to be taken into consideration when forming a file information structure for recording data and file information within the optical disc.

It is apparent that seamless playback may occur when recording and reproducing data in data areas physically adjacent to one another. However, a pick-up unit (numeral 11 of FIG. 6) is required to jump to and from data areas that are physically spaced apart (or distant) from one another, and so a separate condition is required for seamless reproduction of the recorded data. More specifically, when using a dual-layer disc, a long period of time is required in a focusing servo of the pick-up unit (numeral 11 of FIG. 6) during a change in the recorded layer, thereby causing difficulty in seamless playback. Therefore, in order to perform seamless playback between recording layers of the dual-layer disc, identical types of AV streams should be continuously recorded within each recording layer. Moreover, a set of file information for controlling the recorded AV streams should be newly defined.

Figure 2:
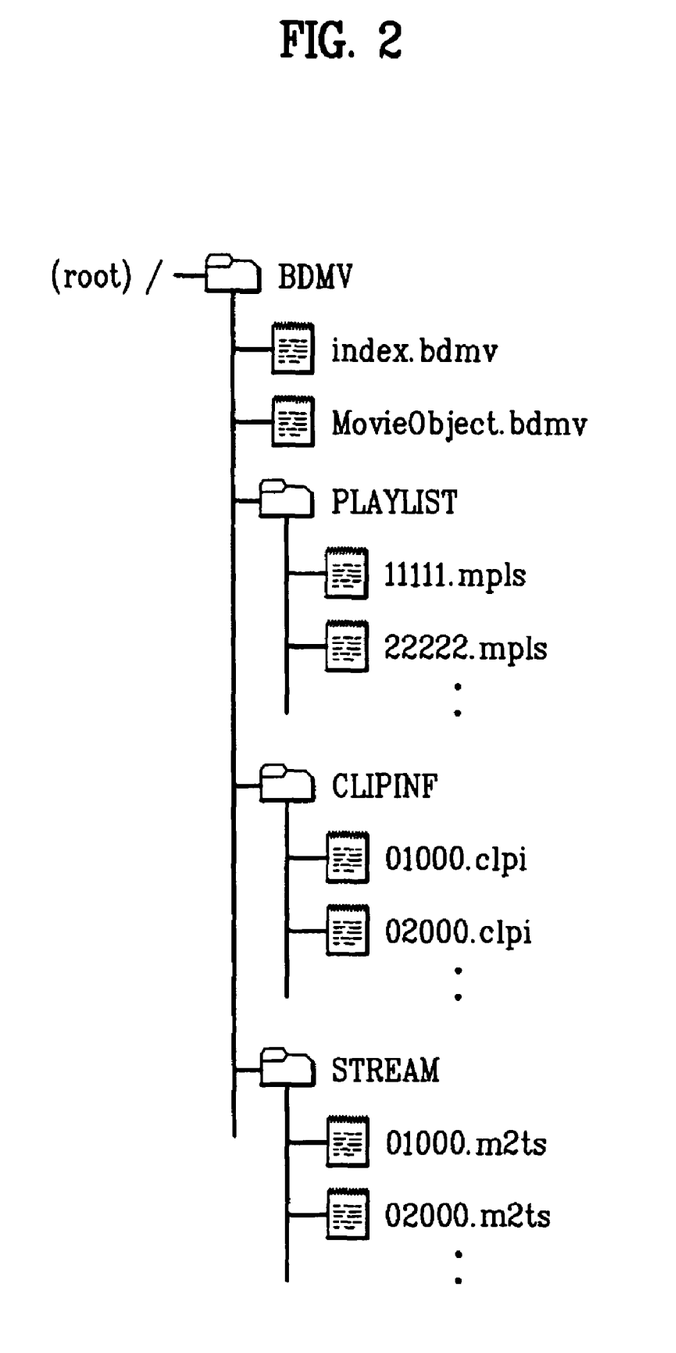
FIG. 2 illustrates a file structure being recorded on an optical disc, the optical disc being a recording medium, according to the present invention.
Figure 3:
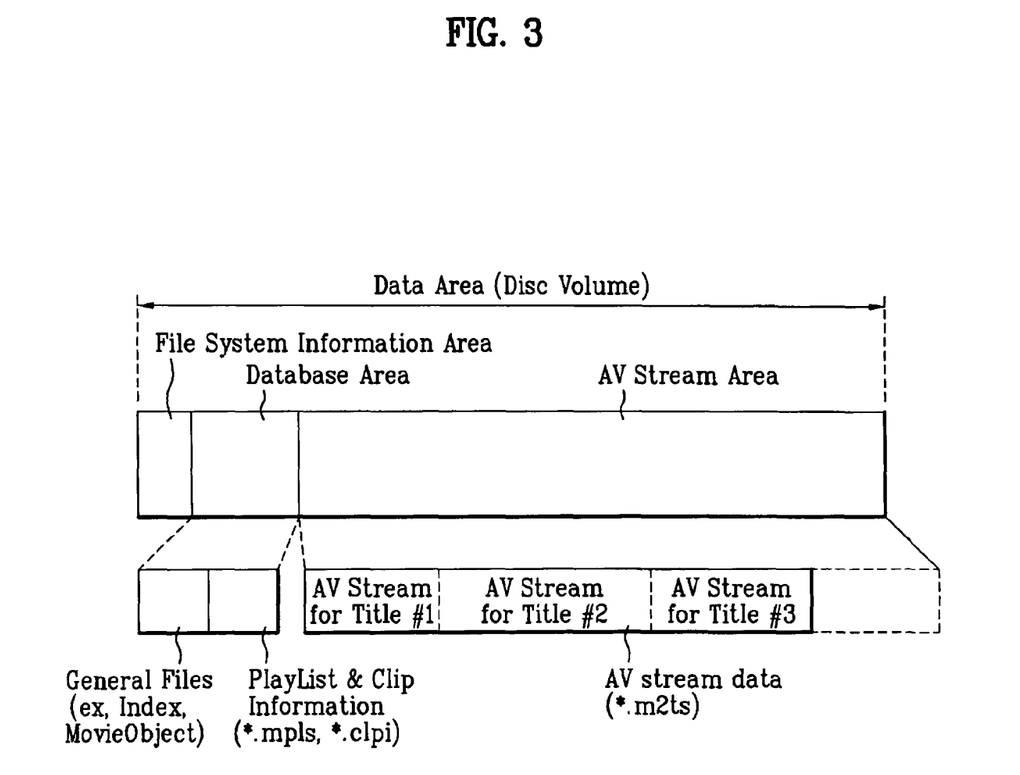
FIG. 3 illustrates a data recording structure being recorded on the optical disc, the optical disc being the recording medium, according to the present invention.

Hereinafter, a file structure required for performing seamless playback between recording layers of the dual-layer optical disc according to the present invention will now be described in detail. FIGS. 2 and 3 respectively illustrate a file structure and a data recorded structure being recorded within an optical disc according to the present invention, wherein the optical disc is a recording medium.

FIG. 2 illustrates a file structure controlling stream data recorded within the optical disc according to the present invention, wherein the optical disc is a recording medium. Herein, at least one BD directory (BDMV) is included in a root directory (root). Each BD directory includes an "index.bdmv" and a "MovieObject.bdmv", which represent general files that are used when interacting with one or more users. For example, the index file contains data representing an index table which includes diverse information regarding a plurality of selectable menus and titles.

Each BD directory includes three file directories including data to be reproduced, and information required for reproducing the data. The file directories included in each BD directory are a stream directory (STREAM), a playlist directory (PLAYLIST), and a clip information directory (CLIPINF). The stream directory includes audio/video (AV) stream (hereinafter referred to as "AV stream") files. More specifically, the AV streams (01000.m2ts, 02000.m2ts) may generally be in the form of MPEG2 transport packets and be named as "*.m2ts". In the present invention, the stream data continuously recorded within the recording layers of the above-described dual-layer disc, will be recorded in the AV stream file format.

Further, the clip information directory (CLIPINF) includes clip information files (01000.clpi, 02000.clpi) being in one-to-one correspondence with the stream files (*.m2ts) included in the stream directory. A clip information file (*.clpi) includes property information and timing information of a corresponding stream file (*.m2ts), wherein the timing information includes mapping information that maps presentation time stamp (PTS) with source packet number (SPN) using entry point map. In the BD standard, each pair of a stream file (*.m2ts) and its corresponding clip information file (*.clpi), which are in one-to-one correspondence with one another, is designated as a clip. For example, 01000.clpi included in CLIPINF includes the property and timing information of 01000.m2ts included in STREAM, and 01000.clpi and 01000.m2ts form a clip.

Referring back to FIG. 2, the playlist directory (PLAYLIST) includes one or more PlayList files (*.mpls), wherein each PlayList file (*.mpls) includes at least one PlayItem which designates playing interval for a specific original clip. More specifically, a PlayItem includes information designating presentation start and presentation end times (IN-Time and OUT-Time) for reproduction of a specific original clip, which may be designated by clip_Information_File_name within the PlayItem. Accordingly, a PlayList file (*.mpls) represents a basic playback control file for playing-back a desired clip from a combination of one or more PlayItems. Therefore, by providing a PlayItem appropriate for a corresponding playback purpose within the PlayList file (*.mpls), special playback functions, such as trickplay, skipplay, slideshow, and so on, can also be executed. Furthermore, in the present invention, the above-described PlayItem is also used for carrying out seamless playback between recording layers of the dual-layer disc, which will be described in detail with reference to FIG. 4A.

Moreover, at least one of a plurality of title information that can be selected by the user is provided in the "index.bdmv" file, which is a general file for ensuring user interactivity and included in the BD directory (BDMV). Accordingly, in the present invention, the title may be formed in continuation within the recording layers to enable seamless playback between the recording layers of the dual-layer disc. Herein, the specific title formed in continuation within the recording layers is played-back by at least one PlayList file and clip file.

FIG. 3 illustrates information corresponding to the file structure being recorded within the optical disc. Starting from the inner circumference (or center) of the data area, the disc volume includes a file system information area occupying the inmost portion of the disc volume, an AV stream area occupying the outmost portion of the disc volume, and a database area occupied between the file system information area and the stream data area. In the file system information area, system information for controlling the entire data files is recorded. And, actual stream data such as audio/video/graphic data are recorded in the AV stream area. The PlayList files, clip information files, and general files (i.e., Index, MovieObject) are recorded in the database area of the disc volume.

Figure 4A:
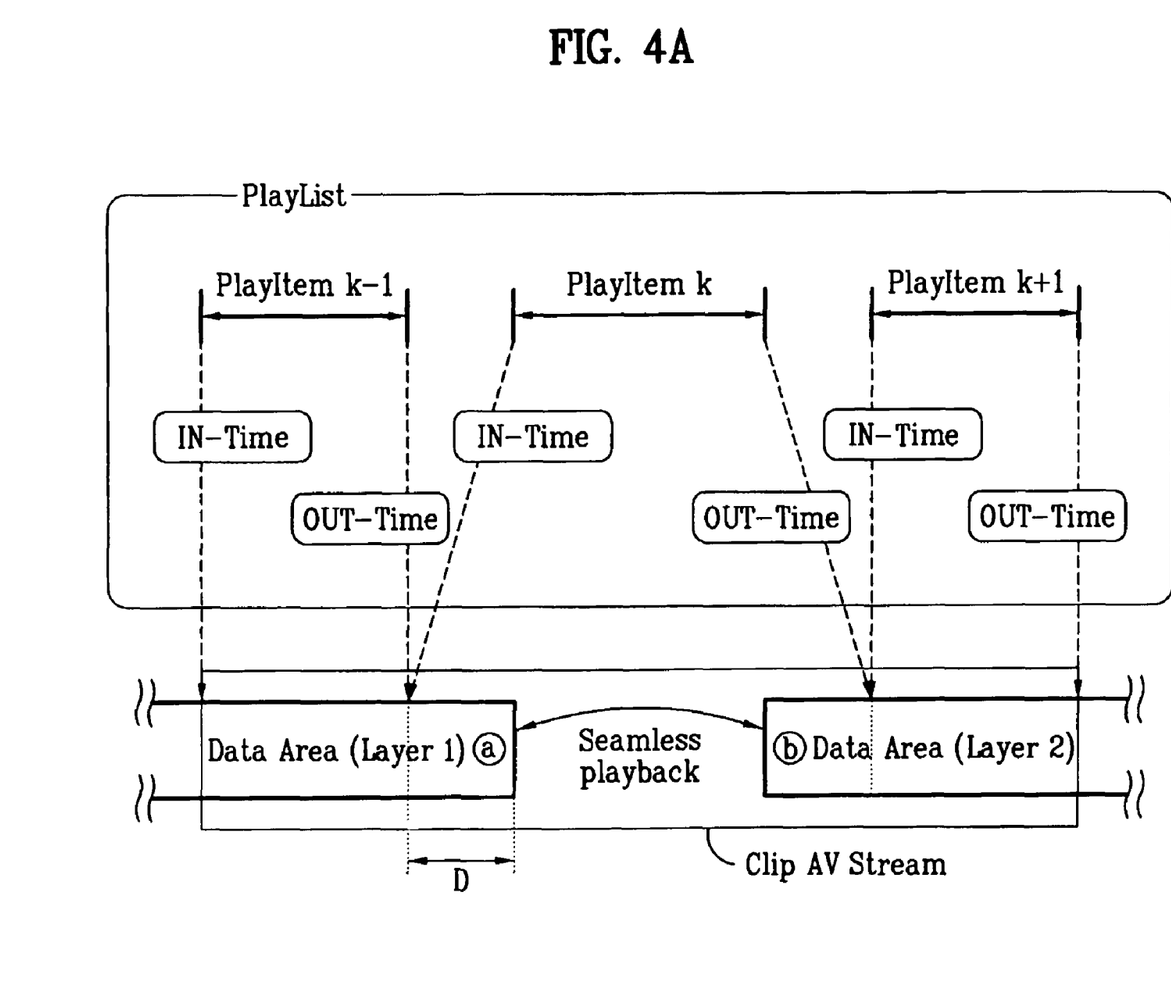
FIGS. 4A and 4B illustrate file information enabling seamless playback between recording layers according to a first embodiment of the present invention.
Figure 4B:
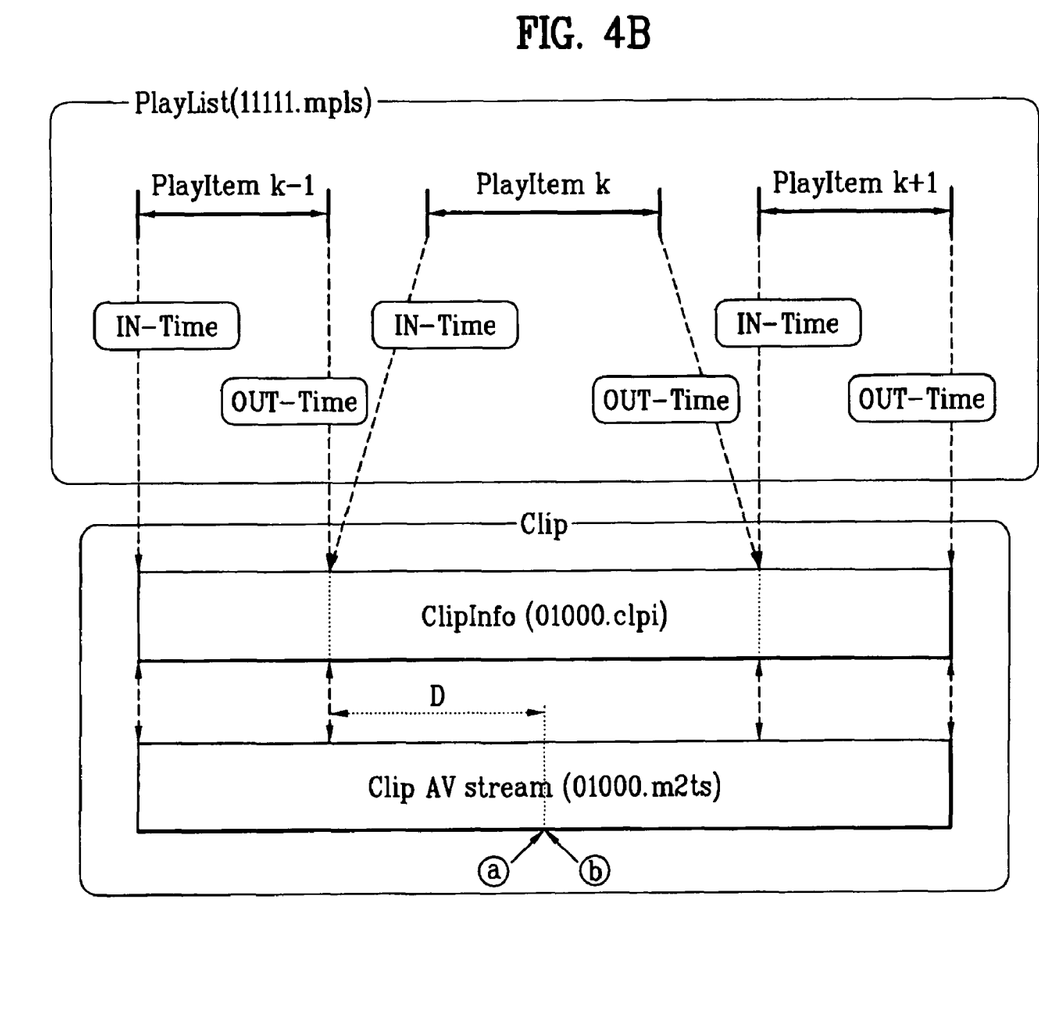

In order to carry out seamless playback between the recording layers of the dual-layer disc according to the present invention, a method of creating file information included in the database area and, more specifically, the PlayList file will now be described in detail with reference to preferred embodiment of the present invention. FIGS. 4A and 4B illustrate file information enabling seamless playback between recording layers according to a first embodiment of the present invention.

The lower portion of FIG. 4A illustrates an expanded view of a last "LSN(ⓐ)" of a first layer and a beginning (or first) "LSN(ⓑ)" of a second layer, as shown in FIG. 1B. In the present invention, a PlayList file, which is a set of file information, enables the seamless playback to be carried out at a connection point between ⓐ and ⓑ. Most particularly, the first embodiment of the present invention includes at least one PlayItem within a PlayList. Herein, a presentation start time (IN-Time) that is controlled by a specific PlayItem (PlayItem k) is positioned right before (or to precede) the last "LSN(ⓐ)" of the first layer, and a presentation end time (OUT-Time) is positioned right after (or to succeed) the beginning (or first) "LSN(ⓑ)" of the second layer. In other words, one PlayItem (PlayItem k) is provided in continuation within the first and second recording layers.

More specifically, for example, three PlayItems (PlayItem k−1, PlayItem k, PlayItem k+1) are included in the PlayList as file information for controlling the AV stream recorded in continuation within the recording layers. Each of the PlayItems is assigned with a specific presentation start time (IN-Time) and a specific presentation end time (OUT-Time), thereby enabling seamless playback between the recording layers, when the PlayItem k is played-back. Additional factors should be considered when creating the above-described PlayItem k, so as to enable the seamless playback, and such additional factors will now be described in detail. When setting the presentation start time (IN-Time) of the PlayItem k, which is positioned right before (or to precede) the last "LSN(ⓐ)" of the first layer, the presentation start time (IN-Time) of the PlayItem k should be set up so that a size (D) of the data starting from the presentation start time (IN-Time) to the last "LSN(ⓐ)" of the first layer becomes equal to or larger than a predetermined size.

In other words, a change in recording layers is required during the playback of the PlayItem k, and, as described above, in order to change the layers, the pick-up unit (numeral 11 of FIG. 6) should jump from one layer to the next and the related servo (focusing, tracking) should be newly set up, which eventually requires a specific set-up time. The required set-up time is referred to as a "layer change time", which is differently decided in each optical recording and/or reproducing apparatus depending upon the performance capacity of each corresponding system. Generally, the layer change time is known to require a set-up time within the range of 400 milliseconds (msec.) to 3 seconds (sec.). Accordingly, data cannot be read from the optical disc during the layer change time, which may lead to an underflow of a buffer (not shown) within the optical recording and/or reproducing apparatus. Therefore, the presentation start time (IN-Time) of the PlayItem k should be positioned at a point where sufficient data size (D) can be provided, thereby preventing the buffer underflow from occurring.

FIG. 4B illustrates the file information within the file structure, shown in FIG. 2, according to the first embodiment of the present invention. More specifically, the file information recorded within the optical disc includes a PlayList file (11111.mpls) having three PlayItems (PlayItem k−1, PlayItem k, PlayItem k+1), as described above. The file information also includes a clip consisting of an AV stream file (01000.m2ts), in which stream data are continuously recorded within the adjacent recorded layers, and a ClipInfo file (01000.clpi) for controlling the AV stream file (01000.m2ts). Also, when forming a PlayItem k within the PlayList file (11111.mpls), a presentation start time (IN-Time) and a presentation end time (OUT-Time) should be set-up, so that a connection part ⓐ and ⓑ) connecting the adjacent recording layers is included between the playback time (i.e., from the presentation start time (IN-Time) to the presentation end time (OUT-Time)) of the PlayItem k.

Figure 5A:
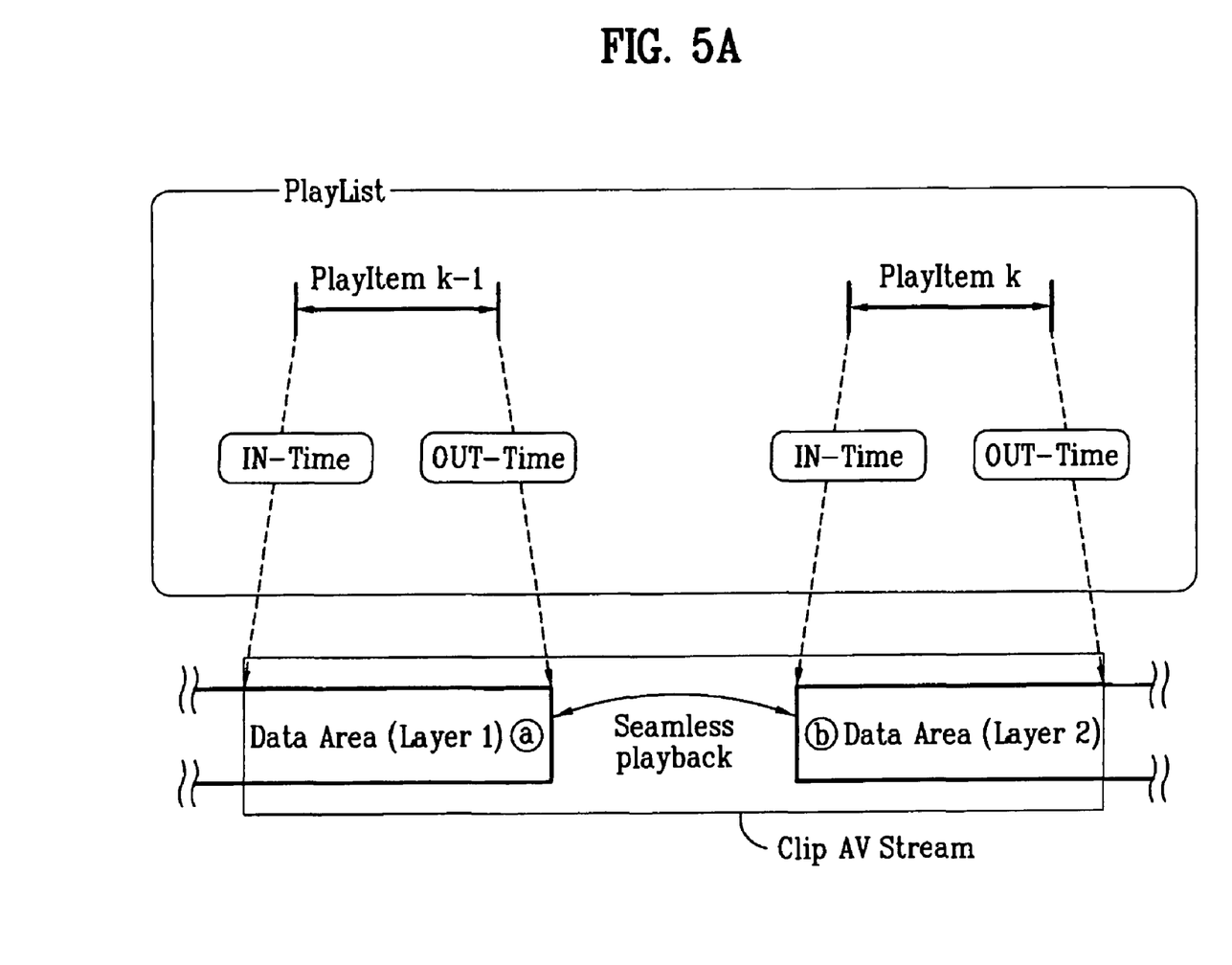
FIGS. 5A to 5C illustrate file information enabling seamless playback between recording layers according to a second embodiment of the present invention.
Figure 5B:
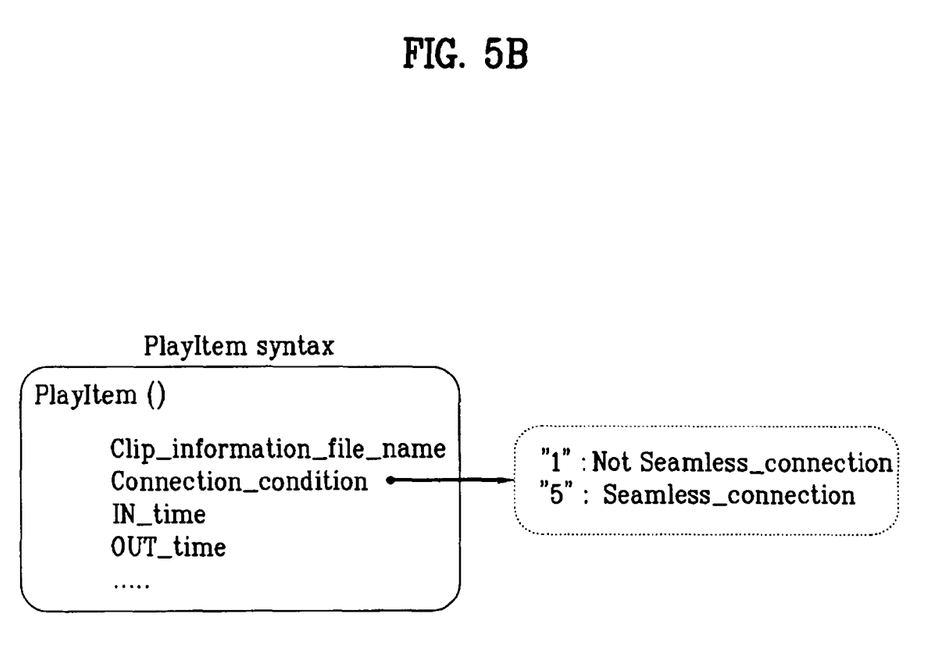
Figure 5C:
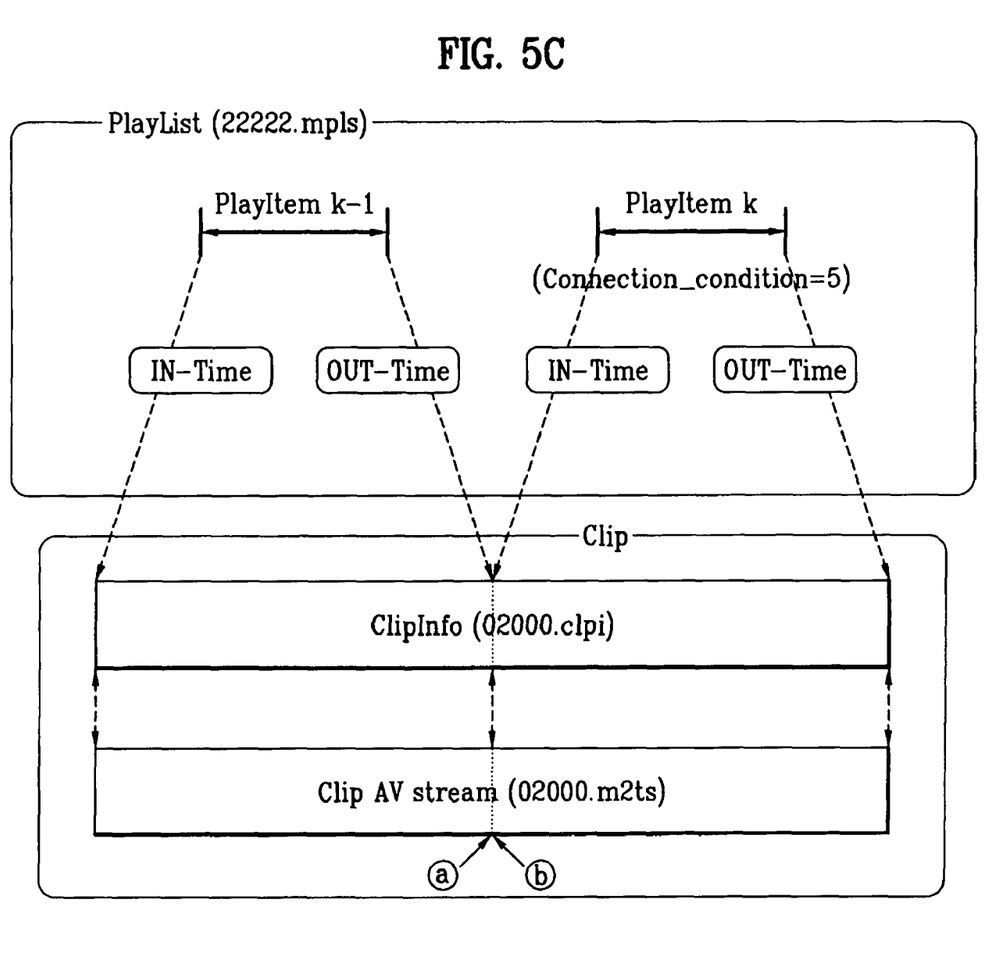

FIGS. 5A to 5C illustrate file information enabling seamless playback between recording layers according to a second embodiment of the present invention. Most particularly, in the second embodiment of the present invention, a plurality of PlayItems is included in a PlayList. However, the PlayItems are individually and separately formed in a point where a change in recording layer occurs.

Referring to FIG. 5A, a presentation end time (OUT-Time) that is controlled by a specific PlayItem (PlayItem k−1) is positioned to be identical to a last "LSN(ⓐ)" of a first layer, and a presentation start time (IN-Time) that is controlled by a following PlayItem (PlayItem k) is positioned to be identical to a beginning (or first) "LSN(ⓑ)" of a second layer. More specifically, for example, at least two PlayItems (PlayItem k−1, PlayItem k) are included in the PlayList as file information for controlling the AV stream recorded formed in continuation within the recording layers. Each of the PlayItems is assigned with a specific presentation start time (IN-Time) and a specific presentation end time (OUT-Time). Herein, the presentation start time (IN-Time) and the presentation end time (OUT-Time) of the PlayItem k−1 are positioned in the first recording layer. And, the presentation start time (IN-Time) and the presentation end time (OUT-Time) of the PlayItem k are positioned in the second recording layer. More specifically, the presentation end time (OUT-Time) of PlayItem k−1 is positioned at the last "LSN(ⓐ)" of the first layer, and the presentation start time (IN-Time) of PlayItem k is positioned at the beginning (or first) "LSN(ⓑ)" of the second layer.

Additional factors should be considered when creating the above-described PlayItem k−1 and PlayItem k, so as to enable the seamless playback, and such additional factors will now be described in detail. A set of seamless connection information, which indicates seamless playback being performed from the PlayItem k−1, should be recorded in the PlayItem k. More specifically, when the optical recording and/or reproducing apparatus plays-back the corresponding PlayList, a set of connection condition information between the preceding PlayItem k−1 and the current PlayItem k is recorded in the current PlayItem k, thereby preventing confusion in the reproducing method. Herein, the connection condition information is used for verifying the seamless playback between the PlayItems.

Further, in order to perform seamless playback between the preceding PlayItem k−1 and the PlayItem k, the presentation start time (IN-Time) and the presentation end time (OUT-Time) of the PlayItem k−1 should be set up, thereby providing a sufficient data size of the data being reproduced by the PlayItem k−1. Generally, it is preferable to set up the presentation start time (IN-Time) and the presentation end time (OUT-Time), so that the size of the data being reproduced by the PlayItem k−1 is equal to 3 seconds (sec.). Accordingly, FIG. 5B illustrates a syntax structure of the PlayItem. In addition to the file name and the presentation start time (IN-Time) and the presentation end time (OUT-Time) of the ClipInfo being designated, the syntax structure includes a set of connection condition information of the preceding PlayItem. For example, "connection_condition=1" indicates that seamless playback did not occur with the preceding PlayItem (i.e., Not Seamless_connection), and, alternatively, "connection_condition=5" indicates that seamless playback occurred with the preceding PlayItem.

FIG. 5C illustrates the file information within the file structure, shown in FIG. 2, according to the second embodiment of the present invention. More specifically, the file information recorded within the optical disc includes a PlayList file (22222.mpls) having the at least two PlayItems (PlayItem k−1, PlayItem k), as described above. The file information also includes a clip consisting of an AV stream file (02000.m2ts), in which stream data are continuously recorded within the adjacent recorded layers, and a ClipInfo file (02000.clpi) for controlling the AV stream file (02000.m2ts). Also, PlayItem k−1 and PlayItem k within the PlayList file (22222.mpls) are formed, so that each of PlayItem k−1 and PlayItem k reproduces and controls only the stream data recorded within each of the specific recording layers, starting from the boundary of each recording layer. Herein, PlayItem k includes information requiring seamless reproduction with PlayItem k−1 (e.g., the above-described "connection_condition=5").

Conclusively, when comparing the first embodiment of the present invention with the second embodiment of the present invention, in the first embodiment, only one PlayItem (PlayItem k of FIG. 4B) is provided in continuation within the recording layers, and, considering the layer change time, the presentation start time (IN-Time) of the PlayItem is set to a position that can provide sufficient data. On the other hand, in the second embodiment of the present invention, the PlayItem is also formed independently (PlayItem k−1 and PlayItem k of FIG. 5C) when changing layers. However, "connection_condition=5" is separately recorded in the second PlayItem (PlayItem k), and sufficient presentation start time (IN-Time) and presentation end time (OUT-Time) are set up in the first PlayItem (PlayItem k−1), taking the layer change time into account, thereby enabling seamless playback. Accordingly, when adopting any one of the first and second embodiments of the present invention, the PlayList is formed to be continuously controlled within the recording layers. In other words, the presentation start time (IN-Time) of the first PlayItem included in the PlayList is positioned in the first recording layer, and the presentation end time (OUT-Time) of the last PlayItem is positioned in the second recording layer.

Figure 6:
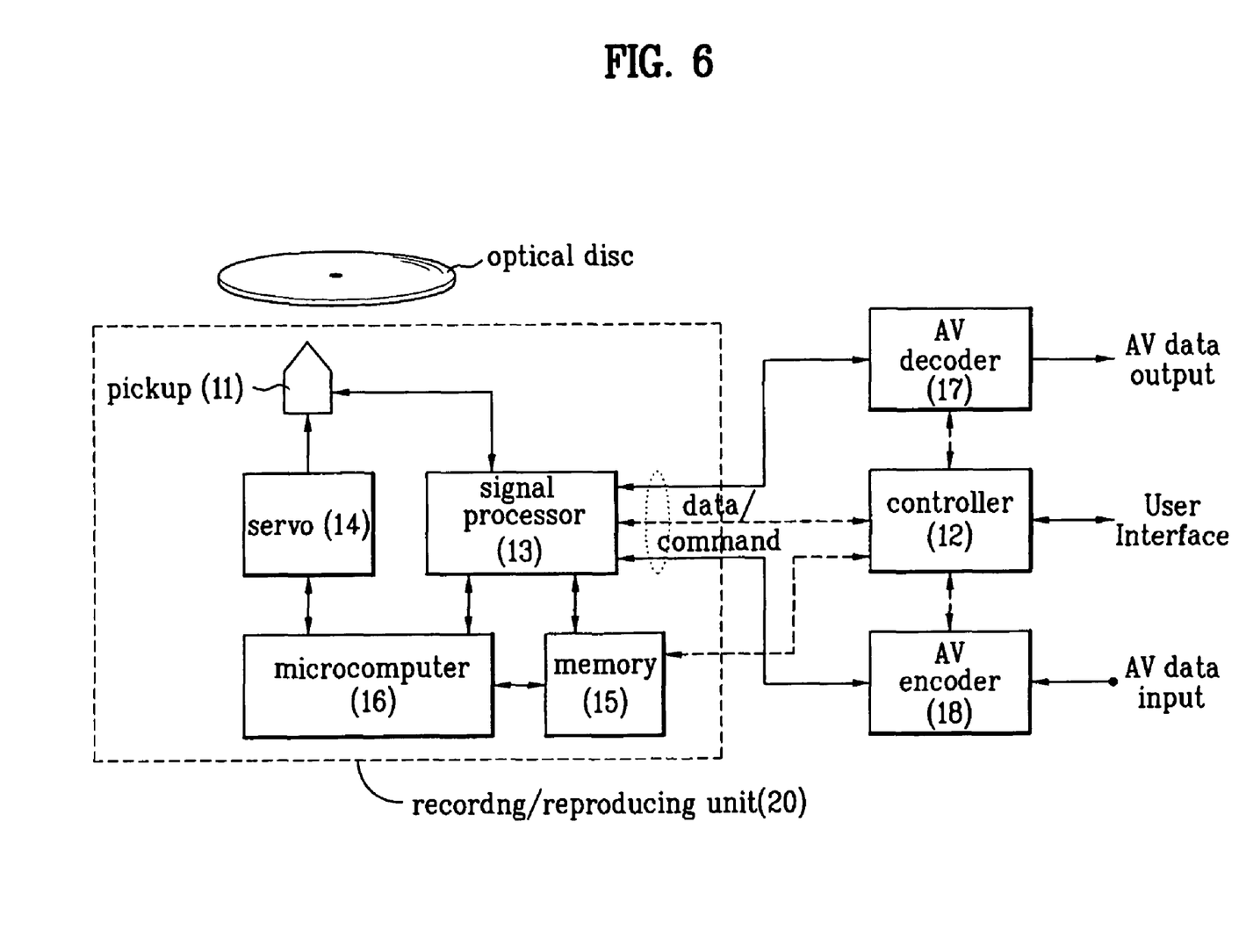
FIG. 6 illustrates an optical recording and/or reproducing apparatus according to the present invention.

FIG. 6 illustrates an optical recording and/or reproducing apparatus according to the present invention. The optical recording and/or reproducing apparatus 10 basically includes a pick-up unit 11 for reading control information including data and file information recorded within an optical disc, a servo 14 controlling the operations of the pick-up unit 11, a signal processor 13 either recovering the playback signal received from the pick-up unit 11 to a desired signal value, or modulating a signal to be recorded to an optical disc recordable signal and transmitting the modulated signal, a memory 15 temporarily storing and allowing usage of such control information, and a microcomputer 16 controlling the above operations. The above-described member parts will be collectively referred to as a recording and/or reproducing unit 20. More specifically, in order to perform the seamless playback between the recording layers of the present invention, the recording and/or reproducing unit 20 controls the pick-up unit 11 to jump at a layer-changing point of the recording layer and newly sets up the servo (focusing, tracking). Furthermore, an AV decoder 17 performs final decoding of output data depending upon the controls of the controller 12. And, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13.

A controller 12 controls all operation of the optical recording and/or reproducing apparatus 10 according to the present invention. When reproducing an optical disc, the controller 12 verifies recorded file information depending upon any one of the first and second embodiments of the present invention. Then, the controller 12 controls the microcomputer 16 and the signal processor 13 of the optical recording and/or reproducing unit 20, so as to enable seamless playback between the recording layers, thereby decoding the read data through the AV decoder 17 and providing the decoded data as a continuous image to the user. Alternatively, when recording data within the optical disc, AV stream data is encoded from the AV encoder 18, so as to continuously record the encoded data within the recording layers. Also, the controller 12 controls the microcomputer 16 and the signal processor 13 of the optical recording and/or reproducing unit 20, so that either one of the first embodiments and the second embodiment of the present invention is adopted, thereby recording a set of file information within a database area of the optical disc, shown in FIG. 2. Herein, the file information enables the seamless playback of the recorded data to be carried out.

As described above, the recording medium, the method of creating a file of the recording medium, and the method and apparatus for reproducing the same have the following advantages. Seamless playback is enabled between recording layers in the recording medium, thereby providing an apparatus having a more efficient function to the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of recording data on a recording medium including a plurality of recording layers, comprising:
   continuously recording a stream data file within a first recording layer and a second recording layer among the plurality of recording layers, which are adjacent to one another;
   forming a PlayList file so as to enable seamless playback of the recorded stream data file, the PlayList file including a first PlayItem having a presentation end time (OUT-Time) designating an end portion of the first recording layer and a second PlayItem having a presentation start time (IN-Time) designating a beginning portion of the second recording layer; and
   recording the PlayList on on the recording medium,
   wherein the second PlayItem includes connection condition information indicating whether or not the stream data included in the second PlayItem is seamlessly reproduced with the stream data included in the first PlayItem, and
   a size of the stream data included in the first PlayItem is larger than a predetermined data size, the predetermined data size being decided in accordance with a response time of a system depending upon a change in the recording layer.

2. The method of claim 1, wherein the stream data included in the first PlayItem and the stream data included in the second PlayItem are formed as one title.

3. The method of claim 1, wherein the PlayItem includes a file name of a clip storing the stream data.

4. An apparatus for recording data on a recording medium including a plurality of recording layers, comprising:
   a recording unit configured to record data on the recording medium; and
   a controller configured to:
   control the recording unit to continuously record a stream data file within a first recording layer and a second recording layer among the plurality of recording layers, which are adjacent to one another,
   form a PlayList file so as to enable seamless playback of the recorded stream data file, the PlayList file including a first PlayItem having a presentation end time (OUT-Time) designating an end portion of the first recording layer and a second PlayItem having a presentation start time (IN-Time) designating a beginning portion of the second recording layer, and
   control the recording unit to record the PlayList on the recording medium,
   wherein the second PlayItem includes connection condition information indicating whether or not the stream data included in the second PlayItem is seamlessly reproduced with the stream data included in the first PlayItem, and
   a size of the stream data included in the first PlayItem is larger than a predetermined data size, the predetermined data size being decided in accordance with a response time of the recording unit depending upon a change in the recording layer.

5. A method of reproducing data from a recording medium including a plurality of recording layers, comprising:
   reading a PlayList file from the recording medium,
   wherein the PlayList file includes at least one PlayItem, in order to control playback of a stream data file, which is continuously recorded within a first recording layer and a second recording layer among the plurality of recording layers, which are adjacent to one another, the PlayList file including a first PlayItem having a presentation end time (OUT-Time) designating an end portion of the first recording layer and a second PlayItem having a presentation start time (IN-Time) designating a beginning portion of the second recording layer, wherein the second PlayItem includes connection condition information indicating whether or not the stream data included in the second PlayItem is seamlessly reproduced with the stream data included in the first PlayItem, and a size of the stream data included in the first PlayItem is larger than a predetermined data size, the predetermined data size being decided in accordance with a response time of a system depending upon a change in the recording layer; and performing seamless playback of the stream data recorded between the first recording layer and the second recording layer, based upon the read PlayList file.

6. An apparatus for reproducing data from a recording medium including a plurality of recording layers, comprising:

a reading unit configured to read data from the recording medium; and a controller configured to:

control the reading unit to read a PlayList file from the recording medium, wherein the PlayList file includes at least one PlayItem, in order to control playback of a stream data file, which is continuously recorded within a first recording layer and a second recording layer among the plurality of recording layers, which are adjacent to one another, the PlayList file including a first PlayItem having a presentation end time (OUT-Time) designating an end portion of the first recording layer and a second PlayItem having a presentation start time (IN-Time) designating a beginning portion of the second recording layer, wherein the second PlayItem includes connection condition information indicating whether or not the stream data included in the second PlayItem is seamlessly reproduced with the stream data included in the first PlayItem, and a size of the stream data included in the first PlayItem is larger than a predetermined data size, the predetermined data size being decided in accordance with a response time of the reading unit depending upon a change in the recording layer, and perform seamless playback of the stream data recorded between the first recording layer and the second recording layer, based upon the read PlayList file.

7. The method of claim 5, wherein the stream data included in the first PlayItem and the stream data included in the second PlayItem are formed as one title.

8. The method of claims 5, wherein the PlayItem includes a file name of a clip storing the stream data.

9. The apparatus of claim 6, wherein the stream data included in the first PlayItem and the stream data included in the second PlayItem are formed as one title.

10. The apparatus of claim 6, wherein the PlayItem includes a file name of a clip storing the stream data.

11. The apparatus of claim 4, wherein the stream data included in the first PlayItem and the stream data included in the second PlayItem are formed as one title.

12. The apparatus of claim 4, wherein the PlayItem includes a file name of a clip storing the stream data.

\* \* \* \* \*